Dec. 30, 1969     A. FISCHER     3,486,269

ROTARY ELEMENT

Filed March 10, 1966

INVENTOR.

ARTUR FISCHER

BY

Michael J. Striker

United States Patent Office 3,486,269
Patented Dec. 30, 1969

3,486,269
ROTARY ELEMENT
Artur Fischer, Tumlingen, kreis Freudenstadt, Germany
Filed Mar. 10, 1966, Ser. No. 533,284
Claims priority, application Germany, Apr. 26, 1965,
F 45,913
Int. Cl. A63h 29/34
U.S. Cl. 46—17        10 Claims

ABSTRACT OF THE DISCLOSURE

A wheel has a circumferential surface and an annular lateral surface adjacent to one axial end of the circumferential surface. Frictional motion transmitting means is provided on at least one of these surfaces and mechanical motion transmitting means is provided at least on the other of these surfaces, both motion transmitting means being adapted to cooperate with corresponding means provided on a cooperating rotary element for thereby transmitting motion to or from this element.

---

Figure 1:
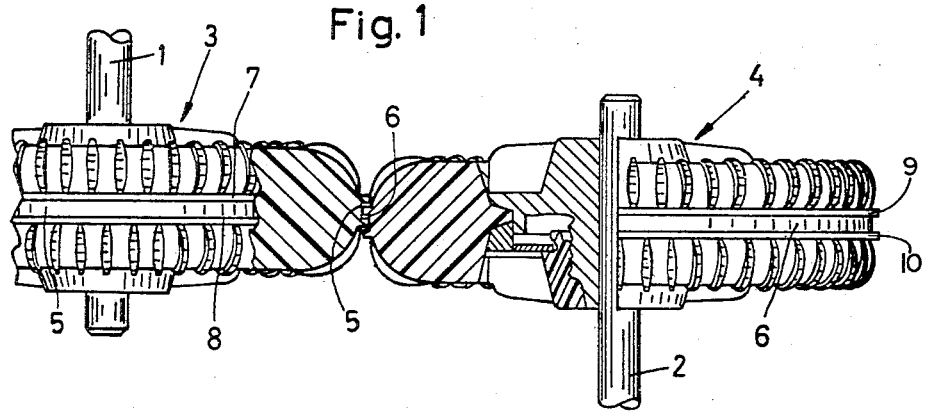

The present invention relates to a rotary element. More specifically, the invention relates to a rotary element which is particularly suitable for use in toy constructions. Still more specifically, the invention relates to a rotary element which permits both the frictional and mechanical transmission of motion to and from a similar rotary element used in conjunction with it.

It is often necessary or desirable to transmit motions by a simple and uncomplicated means. This is particularly true in toys, such as toy vehicles or devices, or in toy construction kits, where the accuracy of gear transmissions is neither available nor desired, particularly in view of the fact that this would raise the cost of the toy.

Previous solutions which have been attempted for this problem are not satisfactory for a variety of reasons.

It is therefore a general object of the present invention to provide a rotary element suitable for motion-transmission purposes.

A more specific object of the invention is to provide a rotary element which is capable of transmitting motion both frictionally and mechanically.

Yet a more specific object of the invention is to provide such a rotary element which may serve as a coupling in that the element may be coupled together with a similar element for achieving a common motion by transmission of motion from one to the other of the elements.

In accordance with one feature of the invention I provide a rotary element, particularly an element suitable for use in toy constructions, which comprises a wheel having a circumferential surface and an annular lateral surface adjacent to one axial end of the circumferential surface. One of these surfaces is provided with frictional motion-transmitting means, and the other of the surfaces is provided with mechanical motion-transmitting means, and both of these motion-transmitting means are adapted to cooperate wtih corresponding means provided on another similar element, so that motion is thereby transmitted from one to the other of such elements.

Advantageously, the novel rotary element is provided in form of a wheel of a resilient material, such as a resilient plastic, natural rubber or artificial rubber. This wheel may have one or all of its surfaces provided; in other words, the circumferential as well as the annular lateral surfaces may be provided with such profiling. By properly arranging profiling on the circumferential surface of the wheel the latter can transmit or receive motion if used in conjunction with another similar wheel which is arranged in axially parallel relationship with it so that the respective circumferential surfaces of both wheels touch and frictionally engage one another. Again, by properly profiling certain portions of the circumferential surface and of one or both of the annular lateral surfaces, two such wheels can transmit motions by being arranged in almost any desired angular relationship in which the profiles of the respective wheels engage one another so that mechanical motion-transmission takes place. Furthermore, two or more such wheels may be arranged in juxtaposed relationship of their annular lateral surfaces, with the profiles of the respective lateral surfaces engaging one another so that the respective wheels are thus "locked" together for common movement.

Figure 2:
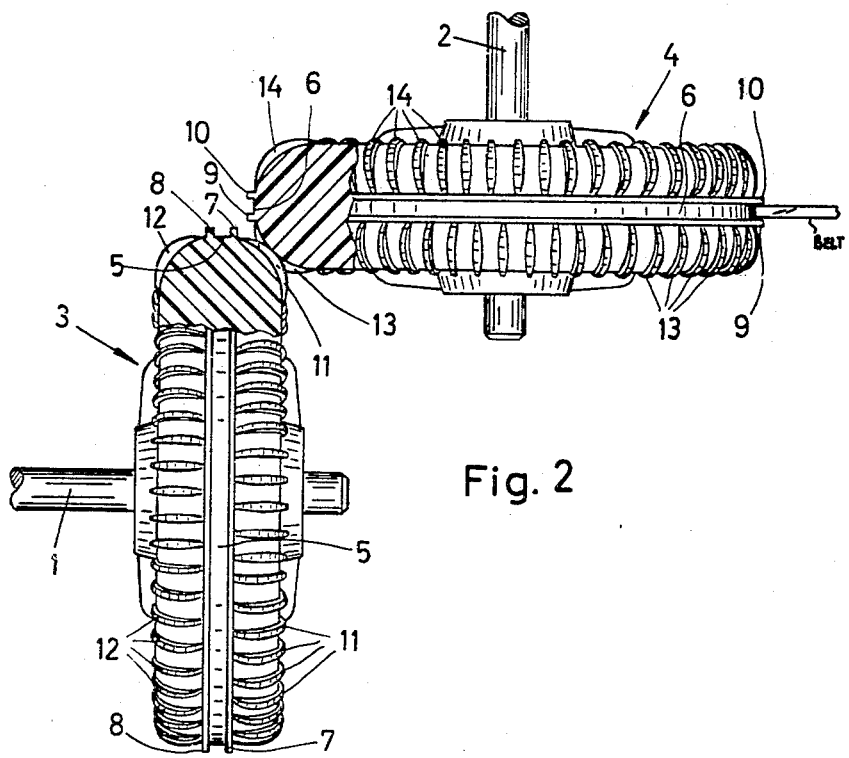

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 shows two identical wheels constructed in accordance with the present invention and arranged in frictionally motion-transmitting relationship; and FIG. 2 shows the same two wheels extending at right angles to one another and arranged in mechanically motion-transmitting relationship.

Referring now to the drawing in detail, and firstly to FIG. 1 thereof, it will be seen that there are shown two wheels 3 and 4 which are respectively arranged on the axles or shafts 1 and 2. Each of the wheels 3, 4 is provided with two types of profiling on its surfaces. Discussing firstly the profiling serving for the frictional transmission of motion, it will be noted that the wheel 3 is provided on its circumferential surface with a pair of axially spaced annular ridges 7, 8 which project outwardly from the circumferential surface. Between themselves these ridges define an annular peripheral recess 5. The same arrangement is true for wheel 4, where the ridges are identified with reference numerals 9 and 10, and the annular depression with reference numeral 6. It will be noted that the width of the depression is greater than the width of any one of the ridges 7–10.

For frictional motion-transmission between the wheels 3 and 4 one of the ridges—either one of the ridges 7, 8 of the wheel 3 or one of the ridges 9, 10 of the wheel 4—is received in the depression between the pair of ridges of the cooperating wheel and it will be understood, of course, that the height of the ridges is such that, when one of the ridges of one wheel is received between the pair of ridges of the other wheel, it will touch and frictionally engage the bottom surface of the respective depression 5 or 6. Thus, it is clear that when one of the wheels 3 or 4 rotates, the other of the wheels will be driven thereby as a result of the frictional engagement of the respective ridge with the bottom surface of the recess on the other wheel. The fact that the ridge so received is disposed between the pair of ridges of the other wheel serves to prevent axial displacement of one wheel relative to the other, so that the two wheels will always remain in proper frictional engagement with one another.

Of course, there are further possibilities inherent in this particular embodiment. For instance, if motion is to be further transmitted from one or the other of the engaging wheels 3, 4 to a remotely located element, it is possible to have a cord, belt or similar element received in one of the recesses 5 or 6 since, as is clearly evident, the width of the recesses is such that it exceeds by a sufficient distance the width of the ridges 7–10. Thus, a motion-transmitting means, such as a cord or belt, can be received in the respective recess 5 or 6 alongside one of the ridges of the other wheel. Furthermore, if it should be desired or necessary to have the wheels 3, 4 spaced apart so that no frictional engagement is possible, a suitable motion transmitting means, such as a belt or band may be passed around both of the wheels and be received in both of the depressions 5 and 6. In this case the respective ridges 7, 8 and 9, 10 will serve to center this belt and engagement of the belt with the bottom surface of the respective recess will provide frictional entrainment of one wheel by the other.

However, the frictional motion-transmitting means is not the sole means of transmitting motion to or from the novel rotary element. Rather, laterally of the ridges 7, 8 and 9, 10 the wheels 3 and 4 are each provided with circumferentially spaced radial projections or profiles 11, 12 on wheel 3 and 13, 14 on wheel 4. These projections extend from the respective circumferential faces to one or both of the lateral annular faces of the wheels 3 and 4 and to some extent project axially beyond such lateral annular faces.

The use of this mechanical motion transmitting means is shown more clearly in FIG. 2 where the wheels 3, 4 are seen to be so arranged that their respective shafts 1, 2 extend at right angles to one another. In this position the projections 11 of wheel 3 and 13 of wheel 4 engage one another in the manner of gear teeth and a mechanical motion-transmission thus takes place if one or the other of the wheels 3, 4 is rotated. It should be noted, however, that this arrangement of the wheels 3, 4 with their axes at right angles to one another is by no means the only position in which such mechanical motion-transmission can take place. Rather, it is one of the considerable advantages of the novel rotary element that mechanical motion-transmission between cooperating axes of such elements can occur regardless of the angle at which the axes of the respective elements extend to one another. This angular relationship can be varied at will and the elements, that is the wheels 3, 4, may even be arranged coaxially if care is taken that their respective hubs do not project axially beyond the respective lateral annular faces to an extent greater than that of the projections 11, 12 and 13, 14. Again, the wheels 3, 4 may be disposed with their axes extending parallel and transversely spaced from one another and with peripheral portions of their lateral faces in abutment, whereby the lateral projections on one wheel also engage lateral projections on the other wheel and mechanical entrainment again ensues. Returning to the coaxial arrangement, it is pointed out that in such a position of the wheels 3, 4 there is provided an especially wide composite circumferential surface on which for instance a drive belt may be placed for driving a remotely located unit. Of course, this is again not the only possibility and such a composite circumferential surface may for example also be utilized to wind thereonto a cord, e.g., if the wheels 3, 4 together constitute he cable drum of a toy crane and the cord represents the cable to which a crane hook or bucket is secured and which is to be taken up by this drum. In the case of utilizing the combined wheels 3, 4 for winding a cord thereon, construction of the wheels from an elastic material is of particular advantage since it provides good frictional engagement with the cord.

Without further analysis, the foregoing will so fully revel the gist of the present invention that others can by applying current knowledge readily adapt it for various applications without omitting features which, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A rotary element, comprising a wheel having a circumferential surface and an annular lateral surface adjacent to one axial end of said circumferential surface; frictional motion-transmitting means provided on one of said surfaces extending in circumferential direction of said wheel; and mechanical motion-transmitting means provided on the other of said surfaces extending transversally to said circumferential direction, both of said motion-transmitting means projecting outwardly beyond said one of said surfaces and the other of said surfaces respectively.

2. A pair of toy rotary elements, each said rotary element comprising a wheel having a circumferential surface and an annular lateral surface adjacent to one axial end of said circumeferential surface; frictional motion-transmitting means provided on one of said surfaces and including a pair of axially spaced peripheral ridges projecting radially from said circumferential surface and defining between themselves a circumferentially extending recess having a bottom wall; and mechanical motion-transmitting means provided on the other of said surfaces, said recess receiving one of a pair of corresponding ridges constituting cooperating frictional motion-transmitting means provided on a secondary rotary element for frictional cooperative engagement with said bottom wall and said mechanical motion-transmitting means cooperatively engaging a corresponding means provided on said second rotary element whereby, when one of said elements rotates, motion is transmitted between said elements by the motion-transmitting means of said rotary elements which are respectively cooperatively engaged.

3. An element as defined in claim 2, wherein said mechanical motion-transmitting means extends from said other to said one surface.

4. An element as defined in claim 2, wherein said frictional motion-transmitting means comprises peripheral ridge means projecting radially from said circumferential surface of said wheel.

5. A element as defined in claim 2, wherein said mechanical motion-transmitting means comprises a plurality of circuferentially spaced projections.

6. An element as defined in claim 5, wherein said projections extend radially of the axis of said wheel.

7. An element as defined in claim 5, wherein said projections extend outwardly beyond said annular lateral surface.

8. An element as defined in claim 2, wherein said mechanical motion-transmitting is so arranged as to enable motion-transmitting cooperation with said second rotary element in any respective angular positions of said rotary elements.

9. An element as defined in claim 8, wherein said mechanical motion-transmitting means is operative for motion-transmission in face-to-face juxtaposition of the respective lateral annular surfaces of said rotary elements.

10. An element as defined in claim 2, wherein said recess is adapted to receive therein a motion-transmitting belt means for transmitting motion between said rotary element and said other similar rotary element when said rotary elements are located remotely from one another.

References Cited

UNITED STATES PATENTS

Re. 26,044    6/1966    Wise _____ 180—74
3,233,358    2/1966    Dehm _____ 46—23

FOREIGN PATENTS 958,433    5/1964    Great Britain.

LOUIS G. MANCENE, Primary Examiner

R. F. CUTTING, Assistant Examiner

U.S. Cl. X.R.

46—221; 180—74